United States Patent
Drevö et al.

(10) Patent No.: US 10,543,769 B2
(45) Date of Patent: Jan. 28, 2020

(54) METHOD, SYSTEM AND COMPUTER PROGRAM OF DETECTING A TIRE PRESSURE DEVICE

(75) Inventors: Markus Drevö, Linköping (SE);
Anders Stenman, Linköping (SE);
Peter Lindskog, Linköping (SE)

(73) Assignee: NIRA DYNAMICS AB, Linkoping (SE)

( * ) Notice: Subject to any disclaimer, the term of this patent is extended or adjusted under 35 U.S.C. 154(b) by 783 days.

(21) Appl. No.: 12/531,688

(22) PCT Filed: Mar. 16, 2007

(86) PCT No.: PCT/EP2007/002371
§ 371 (c)(1),
(2), (4) Date: Mar. 22, 2010

(87) PCT Pub. No.: WO2008/113383
PCT Pub. Date: Sep. 25, 2008

(65) Prior Publication Data
US 2010/0191495 A1    Jul. 29, 2010

(51) Int. Cl.
*G01L 27/00* (2006.01)
*B60N 2/80* (2018.01)

(52) U.S. Cl.
CPC ............... *B60N 2/80* (2018.02); *G01L 27/00* (2013.01)

(58) Field of Classification Search
CPC ....... G01L 27/00; G01L 19/04; G01D 18/008; B60C 23/0408; B60C 23/061; B60C 23/00

(Continued)

(56) References Cited

U.S. PATENT DOCUMENTS 5,721,374 A    2/1998 Siekkinen et al.
6,092,415 A *  7/2000 Borenius et al. ............ 73/146.2
(Continued)

FOREIGN PATENT DOCUMENTS

DE    10 2004 028 812    2/2005
EP         1 403 100      3/2004
(Continued)

OTHER PUBLICATIONS

PCT International Search Report for PCT Counterpart Application No. PCT/EP2007/002371 containing Communication relating to the Results of the Partial International Search Report, 2 pgs., (dated Jun. 1, 2007).

*Primary Examiner* — Michael P Nghiem
(74) *Attorney, Agent, or Firm* — Womble Bond Dickinson (US) LLP

(57) ABSTRACT

A system and method for issuing a tire pressure deviation in a vehicle's tire is described. The system may include a calculation unit adapted to calculate temporally successive output signals indicative of a tire pressure condition in the vehicle's tire on the basis of temporally successive vehicle's signals. The system may also include a calibration unit adapted to determine a calibration value on the basis of a number of temporally successive output signals from the calculation unit. The system may also include a detection unit configured to detect a tire pressure deviation in the vehicle's tire on the basis of further temporally successive output signals from the calculation unit and the calibration value from the calibration unit, after determination of the calibration value by the calibration unit.

3 Claims, 2 Drawing Sheets

(58) Field of Classification Search
USPC .......................................................... 702/98
See application file for complete search history.

(56) References Cited

U.S. PATENT DOCUMENTS

| | | | |
|---|---|---|---|
| 6,658,928 B1* | 12/2003 | Pollack | B60C 23/0408 |
| | | | 73/146 |
| 6,934,659 B2 | 8/2005 | Polzin | |
| 7,224,267 B1* | 5/2007 | Ellis | B60C 23/0408 |
| | | | 123/1 A |
| 7,263,878 B2 | 9/2007 | Griesser et al. | |
| 2007/0061100 A1* | 3/2007 | Hall | B60C 23/062 |
| | | | 702/140 |
| 2007/0198228 A1* | 8/2007 | Pretzlaff | B60C 23/0416 |
| | | | 702/189 |
| 2010/0164704 A1* | 7/2010 | Lindskog | B60C 23/062 |
| | | | 340/442 |
| 2010/0182142 A1* | 7/2010 | Svedberg et al. | 340/442 |
| 2010/0217471 A1* | 8/2010 | Stenman et al. | 701/29 |
| 2010/0318308 A1* | 12/2010 | Gustaysson et al. | 702/98 |
| 2011/0098882 A1* | 4/2011 | Sugisawa et al. | 701/35 |
| 2011/0231051 A1* | 9/2011 | Gerdin | B60C 23/061 |
| | | | 701/31.4 |

FOREIGN PATENT DOCUMENTS

| | | | | |
|---|---|---|---|---|
| WO | WO 03/086789 | | 10/2003 | |
| WO | WO-2006048271 A1 * | | 5/2006 | B60C 23/0416 |

* cited by examiner

METHOD, SYSTEM AND COMPUTER PROGRAM OF DETECTING A TIRE PRESSURE DEVICE

CROSS-REFERENCE TO RELATED APPLICATION

This patent application is a U.S. National Phase application under 35 U.S.C. § 371 of International Application No. PCT/EP2007/002371, filed on Mar. 16, 2007, entitled METHOD, SYSTEM AND COMPUTER PROGRAM OF DETECTING A TIRE PRESSURE DEVIATION.

FIELD OF THE INVENTION

The present invention relates generally to the detection of a tire pressure deviation in a vehicle's tire and, in particular, to a method, a system, and a computer program for such a detection.

BACKGROUND OF THE INVENTION

Modern cars comprise electronic control systems such as anti-lock-braking systems (ABS), dynamic stability systems, anti-spin systems and traction control systems. Besides these active control systems there also exist driver safety information systems as road friction indicators and tire pressure monitoring systems which present to the driver information about driving and vehicle conditions. Indirect tire pressure monitoring systems are based on indirect detection values of a modern vehicle, such as the wheel speed signals, in order to obtain pressure estimations of a tire. Theses pressure estimations are typically compared with calibration values in order to determine specific tire pressure situations, such as a tire puncture. The calibration values are usually calculated as averages of data gathered during an initial calibration period.

EP 1 403 100 A1 discloses a calibration routine for calculating such calibration values. After having collected a number of data, a first type calibration value is determined which is used to compare it with further collected data in order to determine a tire pressure drop. After having determined the first type calibration value this value is further fine-tuned to obtain a second type calibration value by collecting further data during a fine tuning period.

During the fine tuning period, the calibration value is monitored for tire growth. When tire growth is detected during the fine tuning period the calibration process is restarted. However, no such tire growth is detected before the first type calibration value has been determined.

WO 03/086789 discloses a similar process wherein during the fine tuning period a tire growth situation is differentiated from a pressure loss situation in order to reliably detect the tire growth situation. Again, no tire growth or pressure loss situation will be detected until a first learning value (calibration value) has been determined.

BRIEF SUMMARY OF THE INVENTION

The general problem to be solved by the present invention is to improve the performance of an indirect tire pressure warning system.

The problem will be solved by a method, a system and a computer program according to the independent claims. Further embodiments of the invention are disclosed in the dependent claims.

A first aspect of the invention is directed to a method of detecting a tire pressure deviation in a vehicle's tire. The method comprises calculating temporally successive output signals indicative of a tire pressure condition in the vehicle's tire on the basis of temporally successive vehicle's signals. It further comprises determining a calibration value on the basis of a number of temporally successive output signals. It further comprises, after determination of the calibration value, detecting a tire pressure deviation in the vehicle's tire on the basis of further temporally successive output signals and the calibration value. Finally it comprises, before determination of the calibration value, monitoring the temporal developing of the number of temporally successive output signal, and detecting a pressure deviation on the basis of the temporal developing before having determined the calibration value.

Another aspect of the invention is directed to a system of issuing a tire pressure deviation in a vehicle's tire. The system comprises a calculation unit adapted to calculate temporally successive output signals indicative of a tire pressure condition in the vehicle's tire on the basis of temporally successive vehicle's signals. It further comprises a calibration unit adapted to determine a calibration value on the basis of a number of temporally successive output signals from the calculation unit. It further comprises a detection unit configured to detect a tire pressure deviation in the vehicle's tire on the basis of further temporally successive output signals from the calculation unit and the calibration value from the calibration unit, after determination of the calibration value by the calibration unit. The detection unit is further configured to monitor the temporal developing of the number of temporally successive output signals and to detect a pressure deviation on the basis of the temporal developing before having received the calibration value from the calibration unit.

A further aspect of the invention is directed to a computer program including program code for carrying out a method, when executed on a processing system, of detecting a tire pressure deviation for a vehicle's tire. The method comprises calculating temporally successive output signals indicative of a tire pressure condition in the vehicle's tire on the basis of temporally successive vehicle's signals. It further comprises determining a calibration value on the basis of a number of temporally successive output signals. It further comprises, after determination of the calibration value, detecting a tire pressure deviation in the vehicle's tire on the basis of further temporally successive output signals and the calibration value. Finally it comprises, before determination of the calibration value, monitoring the temporal developing of the number of temporally successive output signal, and detecting a pressure deviation on the basis of the temporal developing before having determined the calibration value.

BRIEF DESCRIPTION OF THE DRAWINGS

Embodiments of the invention will now be described, by way of example, and with reference to the accompanying drawings, in which.

DETAILED DESCRIPTION OF THE PREFERRED EMBODIMENTS

Since indirect tire pressure monitoring is a technique known to the person skilled in the art from general knowledge details of this technique are therefore only described as far as they directly concern the invention. The invention is provided for use in any kind of vehicle having at least one wheel. Vehicles, in general, comprise any type of vehicle having tires, such as cars, bikes, trucks, trailers, and the like.

The different units of the system may in one embodiment of the invention be software-implemented or hardware-implemented as separate and individual units. The system may detect pressure deviations for example based on data from sensors measuring the wheel angular velocity (as used e.g. in ABS). In most embodiments, a wheel radius analysis (WRA) unit and/or a wheel spectrum analysis (WSA) unit may be used to provide data for wheel-relative and/or wheel-individual pressure monitoring. The mentioned WRA modules are only an example of the more general roll radius based modules in indirect tire pressure monitoring which may be also used for the above purposes. Further data, e.g. relating to vehicle or driving conditions (including e.g. vehicle velocity, ambient temperature, load information, driving state information, etc.), may also be provided in some embodiments of the invention; those data may be obtained for example from the vehicle CAN bus via specific units of an indirect tire pressure monitoring system.

In one embodiment a control unit is provided for realizing the above features that is implemented, for instance, as a software routine, a CPU or an ECU. The control unit may in one embodiment respond to external requests and/or react to driving or vehicle conditions or detected tire pressure deviations.

Figure 1:
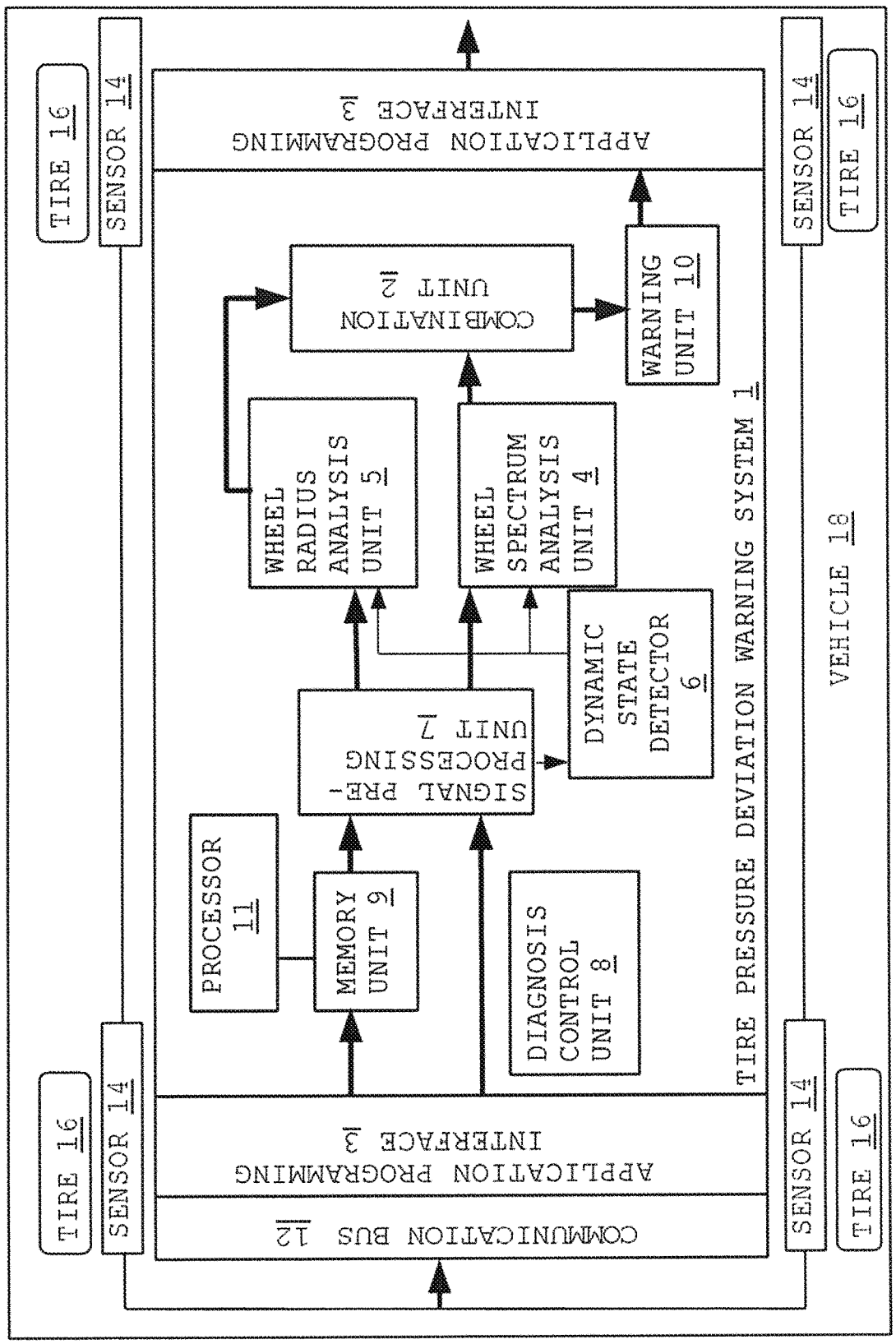
FIG. 1 schematically shows the structure of a system for detecting a tire pressure deviation according to the invention.

Referring now to FIG. 1, a schematic diagram of an embodiment of an inventive tire pressure deviation (TPD) warning system 1 will be described in more detail. The TPD warning system 1 may for example be a standardised software component which is integrated in an electronic control unit of a vehicle 18. The system 1 obtains data by means of an application program interface (API) 3. These obtained data may include on the one hand signals from the vehicle CAN bus 12 e.g. describing the vehicle condition. In order to make those signals available to the different units of system 1 they are stored in a memory unit 9 coupled with a processor 11. On the other hand, the obtained data may include measuring data directly obtained from vehicle's sensors 14, such as rotational speed sensors (as existent in the vehicle's ABS) which indicate the angular velocity of the rotating wheels 16.

A diagnosis control unit 8 performs internal system and input signal checks and sets system status and error codes. If a severe error occurs, this unit can disable the TPD warning system 1.

The obtained data are input to a signal pre-processing unit 7 which pre-filters signals in order to remove disturbances and offsets and pre-computes signals and quantities used by the other units.

Then, the pre-processed signals output by the signal pre-processing unit 7 are input to a wheel radius analysis (WRA) unit 5 and a wheel spectrum analysis (WSA) unit 4. Optionally, information is input to the WRA unit 5 and the WSA unit 4 informing about special driving conditions (e.g. driving on rough roads, driving with snow chains, etc.) detected by a dynamic state detector 6 based on data from the signal pre-processing unit 7 which will be considered for the data analysis.

In essence, a WRA as executed in the WRA unit 5 is based on the fact that the wheel speed of a wheel depends on the respective wheel radius: the wheel speed increases with decreasing wheel radius. Changes in the wheel radii contain information about changes in the tire pressure of the corresponding wheels, but may also reflect vehicle load changes and surface changes or react on driving forces (acceleration, braking, forces in curves, etc.).

Based on the wheel angular velocity signals obtained from unit 7, the WRA unit 5 estimates changes in the relative wheel radii in a subset of the vehicle's tires, but not in all vehicle's tires simultaneously since the approach relies on relative wheel radius estimates rather than absolute ones. In order to obtain wheel radius estimates for each wheel separately, the WRA unit 5 transforms the relative wheel radii into wheel individual radius estimates.

The WSA unit 4 detects changes in the spectral properties of each of the four wheel angular velocity signals. The tire pressure has significant influence on the characteristics of the spectrum of the angular velocity signal; however, the road surface and the ambient temperature also have an impact on the angular velocity signal spectrum and may be preferably considered. By calculating first a parametric model of the wheel velocity spectrum and using the parameters of this model to calculate a spectral shape factor that condenses the different pressure dependent features of the spectrum into one single scalar quantity, the WSA unit 4 detects changes in the tire pressure for each wheel individually.

The combination unit 2 obtains data from the WRA unit 5 and the WSA unit 4. Based on these input data, it detects tire pressure deviations and outputs a tire pressure signal indicating a tire pressure deviation to a warning unit 10. Under certain circumstances, which will be described in more detail below, the warning unit 10 issues a warning signal to the API 3. In turn, the API 3 provides the data to external applications, such as a signaling unit installed within the driver cabin.

The warning unit 10 uses the tire pressure signal obtained from the combination unit 2 to trigger the issuance of a warning signal. The warning unit 10 may issue the warning signal to an external unit, program or application. The external units or programs may, for instance, store the output data in a memory unit or directly alert the vehicle user about the pressure deviation. In some embodiments of the invention, the warning signal further specifies the detected pressure deviating tires, that is, the number and position of pressure deviating tires.

Figure 2:
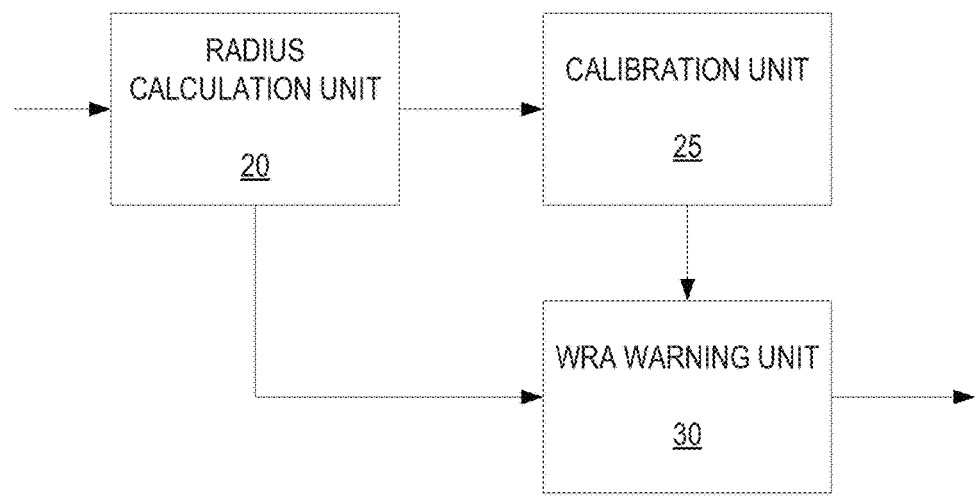
FIG. 2 schematically shows the structure of a WRA unit shown in FIG. 1.

Referring now to FIG. 2, the WRA unit 5 will be described in more detail. The WRA unit 5 comprises a radius calculation unit 20, a calibration unit 25 and a WRA warning unit 30. The radius calculation unit 20 receives the wheel angular velocity signals and other signals from the signal pre-processing unit 7 in a temporal successive manner (for instance, with a first repetition rate of 10 Hz) and outputs estimates of the relative wheel radii $WRA_x$ (wherein x={FL, FR,RL,RR}) in a temporal successive manner. The relative wheel radii estimates $WRA_x$ may be defined as follows:

$$WRA_{FL} = (radius_{RL} - radius_{FL})/radius_0,$$

$$WRA_{FR} = (radius_{RR} - radius_{FR})/radius_0,$$

$$WRA_{FL} = (radius_{FL} - radius_{FR})/radius_0,$$

$$WRA_{RR} = (radius_{RL} - radius_{RR})/radius_0$$

wherein $radius_0$ is the known nominal wheel radius, and $radius_{FL}$, $radius_{FR}$, $radius_{RL}$ and $radius_{RR}$ are the current wheel radii for the individual wheels (FL="Front Left", FR="Front right", RL="Rear Left" and RR="Rear Right"). Changes in the relative wheel radii estimates $WRA_x$ indicate pressure deviations in the wheels. Hence, changes in $WRA_x$ may be used as indicators of an under-inflation situation. As an example, consider the relative wheel radii trajectory illustrated in FIG. 3. At time t=0 min, the pressure of the front left tire is decreased which results in changes in the relative wheel radii $WRA_{FL}$ and $WRA_{RL}$.

Typically, the time interval between consecutive relative wheel radii estimates $WRA_x$ which are outputted from the radius calculation unit 20 is longer than the time interval between consecutive wheel angular velocity signals which are inputted to the radius calculation unit 20 (for instance, with a second repetition rate of 0.1 up to 0.01 Hz). These wheel radii estimates $WRA_x$ are fed to the calibration unit 25 and the WRA warning unit 30. The second repetition rate may vary according to statistical properties of the wheel angular velocity signals. In other words, the radius calculation unit 20 uses a batch of consecutive wheel angular velocity signals in order to output one relative wheel radii estimate $WRA_x$.

Specifically, the radius calculation unit 20 may not discard older wheel angular velocity signals but simply down-weight older signals with a forgetting factor prior to including newer ones. The down-weighting may be continued until a statistical parameter (such as the variance of the batch of input signals) is large enough. Furthermore, for each batch of consecutive wheel angular velocity signals the average batch velocity $v_k$ (k denotes the batch number) may be computed and delivered to the calibration unit 25. Alternatively, the radius calculation unit 20 may also apply a sample-by-sample processing or sliding windows instead of the batch-wise processing as described above.

In the following, the operation of the calibration module 25 is described in more detail. The calibration unit 25 calculates calibration values $WRA_{cal,x}$ characterizing the nominal conditions and stores this values $WRA_{cal,x}$ in an internal nonvolatile memory (the suffix x denotes throughout the description the four different relative wheel radii, cp. above). Since the relative wheel radii estimates $WRA_x$ may be velocity dependent, the calibration values $WRA_{cal,x}$ may be calculated and stored for different velocities, for instance, for different velocity slots. When the driver initializes calibration, the calibration unit 25 is reset and the previously stored calibration values $WRA_{cal,x}$ are erased from the memory. The calibration process is automatic and does not require driver intervention or special maneuvers after it has been initialized. To reduce the effects of measurement noise and disturbances the calibration values $WRA_{cal,x}$ will be calculated as average values over a number of relative wheel radii estimates $WRA_x$, in particular for each velocity slot. Thus, a certain time is needed for the calibration unit 25 to calculate and store these calibration values $WRA_{cal,x}$. Instead of using different velocity slots for determining the calibration values $WRA_{cal,x}$ the latter ones may also be determined for a minimum number of different average batch velocities $v_k$ as delivered from the radius calculation unit 20 and then calibration values $WRA_{cal,x}$ for different velocity values may be calculated by means of an appropriate function fitted to the number of different calibration values $WRA_{cal,x}$ and average batch velocities $v_k$.

In one embodiment, the average batch velocity $v_k$ for batch number k may be converted to a slot index l. Then, if calibration is still active, the calibration value $WRA_{cal,x}$ is updated with the latest batch estimate $WRA_x$ according to the following equation:

$$WRA_{cal,x}(l)=(P_{cal}(l)*WRA_{cal,x}(l)+WRA_x)/(P_{cal}(l)+1)$$

and $$P_{cal}(l)=P_{cal}(l)+1$$

where $P_{cal}(l)$ counts the number of relative wheel radii estimates $WRA_x$ that have been used to update the calibration value $WRA_{cal,x}(l)$ in the specific velocity slot l. The calibration is continued as long as $P_{cal}(l)<P_{max}$, wherein the parameter $P_{max}$ defines the number of relative wheel radii estimates $WRA_x$ used to determine the calibration value $WRA_{cal,x}(l)$. The value of the parameter $P_{max}$ is typically chosen such that the total effective time to complete calibration in one velocity slot lies in the range of a couple of minutes to a couple of hours.

The calibration unit 25 may also monitor the standard deviation of the relative wheel radii estimates $WRA_x$ as received. A large value of the standard deviation of the received relative wheel radii estimates $WRA_x$ may indicate that the calibration values $WRA_{cal,x}$ are uncertain from a statistical point of view. If such an extreme situation has occurred, calibration may actually continue although $P_{cal}(l) \geq P_{max}$.

However, before the calibration unit 25 outputs any calibration values $WRA_{cal,x}$ at all, the minimum requirement is that $P_{cal}(l) \geq P_{min}$, where $P_{min} < P_{max}$. For instance, the value of $P_{min}$ may lie in the range of 5 to 50. Then, the calibration unit 35 delivers the calibration value $WRA_{cal,x}$ thus determined to the WRA warning unit 30.

The calibration unit 25 may further include functionality for linear interpolation and extrapolation of calibration values $WRA_{cal,x}$ to velocity slots l for which the counter $P_{cal}(l)$ does not yet exceed the minimum value $P_{min}$. For example, this functionality enables tire pressure deviation detection for high speed driving although the calibration has been so far completed in low velocity slots only. This functionality may be based on a curvefit, such as a straight-line fit, of the available calibration values $WRA_{cal,x}$. Given estimates of the parameters $c_x$ and $m_x$ describing the straight-lines, further calibration values $WRA_{cal,x}$ to be output to the WRA warning unit 30 may be computed as follows:

$$WRA_{cal,x}=c_x v(k)+m_x$$

It is to be noted that the estimation of the straight-line parameters $c_x$ and $m_x$ cannot be made before there has been some degree of velocity variation. Generally, the straight-line method offers the possibility to extrapolate calibration values $WRA_{cal,x}$ outside the currently calibrated velocity slots l.

Furthermore, in order to comply with some legal requirements (such as the FMVSS 138 requirements) the calibration unit 25 may include functionality to restrict calibration to a maximum time, such as 20 minutes in the speed range 40 to 100 km/h.

In the following, the WRA warning unit 30 will be described in more detail. Its main functionality is to estimate the changes in the relative wheel radii estimates $WRA_x$ as received from the radius calculation unit 20 in comparison to the calibration values $WRA_{cal,x}$ as received from the calibration unit 25 by computing the instantaneous difference $Diff_x$ between these two values as follows:

$$Diff_x=WRA_x-WRA_{cal,x}$$

It may further low-pass filter this instantaneous difference Diff$_x$ and output a low-pass filtered difference value DeltaWRA$_x$ as follows:

$$\text{Delta}WRA_x = \text{LowpassFilter}(\text{Diff}_x)$$

The learning rate of the above low-pass filtering may be influenced by a number of different factors. For example, the learning rate may be slowed down during driving on rough roads or if the statistical uncertainty is deemed large for the current estimate of the relative wheel radii WRA$_x$. For instance, the low-pass filtering may be achieved by the following algorithm:

$$\text{Filter}_x = k_{forget} * (\text{Diff}_x - \text{Delta}WRA_x)$$

Note that DeltaWRA$_x$ corresponds to the current state of the low-pass filter. The actual low-pass filtering is then performed as follows:

$$\text{Delta}WRA_x := \text{Delta}WRA_x + \min(\max(\text{Filter}_x, -\text{Filter}_{max}), \text{Filter}_{max})$$

Filter$_{max}$ is a so-called rate-limiter ensuring that the contribution of a single batch of relative wheel radii estimates WRA$_x$ is limited. The forgetting factor $k_{forget}$ may not be a constant, but may be controlled such that $K_{forget}$ is small when the current batch estimate is judged unreliable and may depend on the average velocity v[k] of the current batch. Hence, it may be tuned such that the low-pass filter has a nominal adaptation rate that is different for normal and high velocities, respectively. The adaptation rate of the low-pass filtering may be further varied in dependence of a detected rough road condition during the present batch, of a statistical uncertainty of the current batch and/or of the average calibration variance in the current velocity slot.

The WRA warning unit 30 is only able to perform the method as s outlined above when the minimum number P$_{min}$ of (batches of) relative wheel radii estimates WRA$_x$ has been collected by the calibration unit 25 as indicated by P$_{cal}$(1) since there are no calibration values WRA$_{cal,x}$ available to the WRA warning unit 30 before this minimum number P$_{min}$ has been collected. Only from this point of time the warning unit 30 is able to start detection of a tire pressure deviation, such as pressure drops, by comparing actual relative wheel radii estimates WRA$_x$ with corresponding calibration values WRA$_{cal,x}$.

Figure 3:
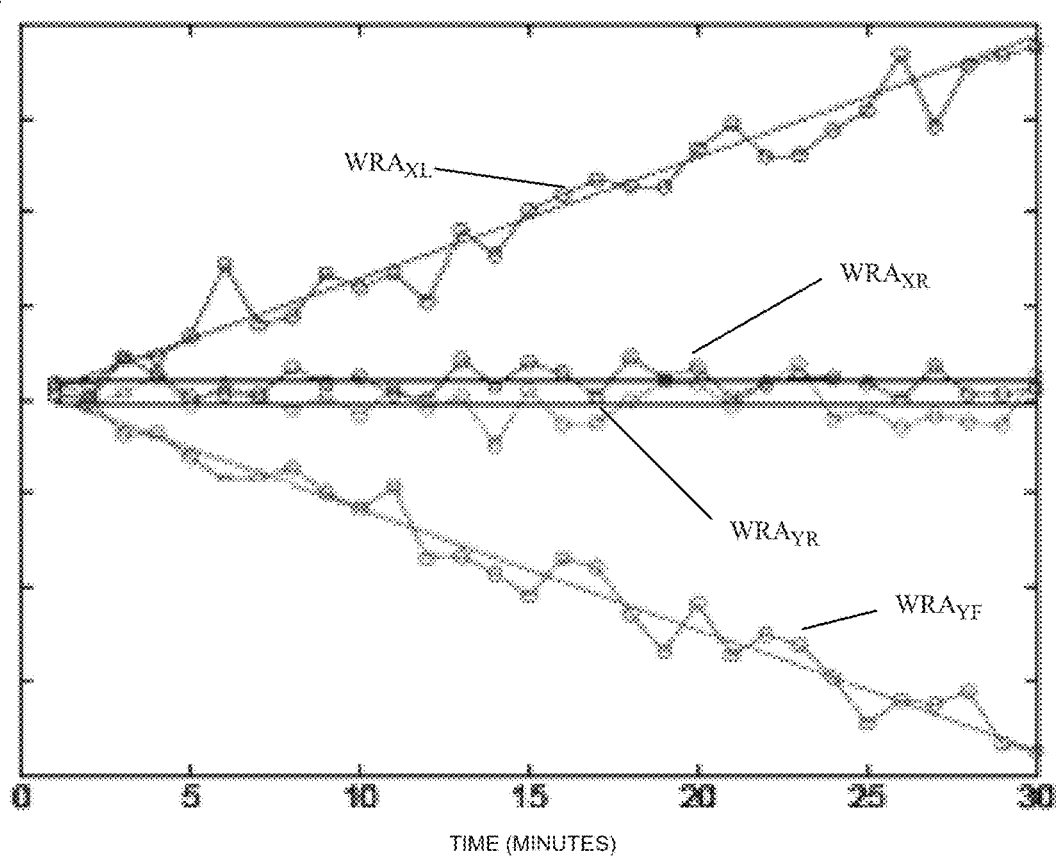
FIG. 3 shows exemplified curves representing a variation in time of the tire pressure signal in order to explain the functioning of the WRA warning unit.

According to the invention the WRA warning unit 30, however, applies a further functionality as discussed below in more detail before the first calibration value WRA$_{cal,x}$ has been determined by the calibration unit 25 in order to detect tire pressure deviations. This functionality detects pressure deviations, such as pressure drops, that occur in a tire during the calibration phase before any calibration value WRA$_{cal,x}$ at all has been determined by the calibration unit 25. The basic idea behind this functionality may be illustrated with respect to the FIG. 3. When the pressure of one tire is slowly decreasing the relative wheel radii WRA$_{FL}$ and WRA$_{RL}$ are temporally developing as shown in FIG. 3. Such a temporal developing may be detected by estimating the gradient of the relative wheel radii estimates WRA$_x$ over time that are calculated by the radius calculation unit 20 or the calibration values WRA$_x$ calculated by the calibration unit 25 before P$_{cal}$ has exceeded P$_{min}$. The gradient thus obtained is then compared to a threshold value. Typically, a minimum number of wheel radius estimates WRA$_x$ or calibration values WRA$_{cal,x}$ (before P$_{cal}$(1) exceeds P$_{min}$) have to be collected in order to reliably estimate the gradient (otherwise the gradient might be too much influenced by noise). This minimum number of values required might be indicated by statistic calculations (such as the standard deviation or the like) on these values. If the gradient exceeds this threshold value then the WRA warning unit 30 outputs a warning signal indicating a leakage during calibration condition or a malfunctioning condition to the combination unit 2 and/or the warning unit 10 and may reset the calibration unit 25. The threshold value may be adaptively changed with the ambient temperature.

Although the functionality of a detection of a leakage during calibration has been described with respect to the WRA unit 5, a similar functionality may alternatively or additionally provided for the WSA unit 4. Similarly, this functionality may be incorporated into another unit of the tire pressure detection system 1, such as the combination unit 2 or the warning unit 10.

Summarizing, the functionality of a detection of a leakage during calibration runs in parallel to the normal calibration routine as described above and detects ongoing pressure drops independently regardless of the calibration status (full, half-full or whatever). Advantageously, this functionality monitors the calibration and looks for trends in the input signals indicating an ongoing pressure drop and, thus, avoids that a pressure drop occurring during the calibration period (e.g. if the driver resets the system for calibration without noticing that one tire has a nail in it or if he tries to get rid of an alarm already issued, without fixing the problem that caused it, by recalibrating the system) results in distorted calibration values degrading the detection performance such that, for instance much larger pressure drops than normal are needed before the under-inflation situation is detected.

What is claimed is:

1. A method of detecting tire pressure deviation in a vehicle's tire, comprising:

receiving, by one or more processors over a communications bus of the vehicle, temporally successive vehicle's signals generated by one or more vehicle sensors that are indicative of one or more conditions of rolling wheels of the vehicle, wherein the one or more vehicle sensors comprise at least one rotational speed sensor that generates temporally successive angular velocity signals for a rolling wheel of the vehicle;

storing, by the one or more processors in a memory, the temporally successive vehicle's signals in a memory;

calculating, by the one or more processors, temporally successive wheel radius analysis output signals (WRA$_x$) indicative of a tire pressure condition in the vehicle's tire based on the temporally successive vehicle's signals including the angular velocity signals stored in the memory;

determining wheel radius calibration values (WRA$_{cal,x}$) based on at least a minimum number (P$_{min}$) of the temporally successive wheel radius analysis output signals (WRA$_x$); and detecting, by the one or more processors, a first tire pressure deviation in the vehicle's tire after determination of the wheel radius calibration values (WRA$_{cal,x}$) based on a further number of the temporally successive wheel radius analysis output signals (WRA$_x$) and the wheel radius calibration values (WRA$_{cal,x}$) by calculating a difference between the wheel radius analysis output signals (WRA$_x$) and corresponding wheel radius calibration values (WRA$_{cal,x}$), wherein the method further comprises:

detecting, by the one or more processors, a second tire pressure deviation of the vehicle's tire before determination of any of the wheel radius calibration values (WRA$_{cal,x}$) by computing a gradient of the wheel radius analysis output signals ($WRA_x$) with respect to time indicative of a temporal developing of the number of the temporally successive wheel radius analysis output signals ($WRA_x$), wherein the gradient is computed based on a comparison of relative wheel radii estimates at one point in time with relative wheel radii estimates at one or more previous points in time, comparing the gradient to a threshold modified according to an ambient temperature before determination of any of the wheel radius calibration values ($WRA_{cal,x}$), and when the gradient exceeds the threshold indicating a pressure drop of the vehicle's tire, resetting a calibration process performed by the one or more processors to prevent the determining of the wheel radius calibration values ($WRA_{cal,x}$) using distorted wheel radius analysis output signals ($WRA_x$) caused by an ongoing pressure drop, wherein distorted wheel radius analysis output signals ($WRA_x$) determined during the ongoing pressure drop degrade leakage detection; and wherein the method further comprises generating a warning signal that activates a warning system of the vehicle when the gradient exceeds the threshold.

2. A system for issuing a tire pressure deviation in a vehicle's tire, comprising:

a communications bus that receives temporally successive vehicle's signals generated by one or more vehicle sensors that are indicative of one or more conditions of rolling wheels of the vehicle, wherein the one or more vehicle sensors comprise at least one rotational speed sensor that generates temporally successive angular velocity signals for a rolling wheel of the vehicle;

one or more processors configured to execute instructions for a tire pressure deviation (TPD) warning system, the one or more processors communicatively coupled with a memory to store the temporally successive vehicle's signals, the one or more processors executing the instruction to:

calculate temporally successive wheel radius analysis output signals ($WRA_x$) indicative of a tire pressure condition in the vehicle's tire based on the temporally successive vehicle's signals including the angular velocity signals stored in the memory;

determine wheel radius calibration values ($WRA_{cal,x}$) based on at least a minimum number ($P_{min}$) of the temporally successive wheel radius analysis output signals ($WRA_x$); and detect a first tire pressure deviation in the vehicle's tire after determination of the wheel radius calibration values ($WRA_{cal,x}$) based on a further number of the temporally successive wheel radius analysis output signals ($WRA_x$) and the wheel radius calibration values ($WRA_{cal,x}$) by calculating a difference between the wheel radius analysis output signals ($WRA_x$) and corresponding wheel radius calibration values ($WRA_{cal,x}$);

wherein the one or more processors are configured to execute additional instructions to:

detect a second tire pressure deviation of the vehicle's tire before determination of any of the wheel radius calibration values ($WRA_{cal,x}$) by computing a gradient of the wheel radius analysis output signals ($WRA_x$) with respect to time indicative of a temporal developing of the number of the temporally successive wheel radius analysis output signals ($WRA_x$), wherein the gradient is computed based on a comparison of relative wheel radii estimates at one point in time with relative wheel radii estimates at one or more previous points in time, comparing the gradient to a threshold modified according to an ambient temperature before determination of any of the wheel radius calibration values ($WRA_{cal,x}$), and when the gradient exceeds the threshold indicating a pressure drop of the vehicle's tire during calibration, resetting a calibration process performed by the one or more processors to prevent the determining of the wheel radius calibration values ($WRA_{cal,x}$) using distorted wheel radius analysis output signals ($WRA_x$) caused by an ongoing pressure drop, wherein distorted wheel radius analysis output signals ($WRA_x$) determined during the ongoing pressure drop degrade leakage detection; and a warning system of the vehicle that is activated in response to receipt of a warning signal generated by the one or more processors, the warning signal generated by the one or more processors when the gradient exceeds the threshold.

3. A non-transitory computer readable storage medium that includes program code for carrying out a method, when executed by one or more processors, of detecting tire pressure deviation in a vehicle's tire, the method comprising:

receiving, by the one or more processors over a communications bus of the vehicle, temporally successive vehicle's signals generated by one or more vehicle sensors that are indicative of one or more conditions of rolling wheels of the vehicle, wherein the one or more vehicle sensors comprise at least one rotational speed sensor that generates temporally successive angular velocity signals for a rolling wheel of the vehicle;

storing by the one or more processors, the temporally successive vehicle's signals in a memory;

calculating, by the one or more processors, temporally successive wheel radius analysis output signals (WRAx) indicative of a tire pressure condition in the vehicle's tire based on temporally successive vehicle's signals including the angular velocity signals stored in the memory;

determining wheel radius calibration value (WRAcal,x) based on a minimum number (Pmin) of the temporally successive wheel radius analysis output signals (WRAx); and detecting, by the one or more processors, a first tire pressure deviation in the vehicle's tire after determination of the wheel radius calibration values (WRAcal,x) based on a further number of the temporally successive wheel radius analysis output signals (WRAx) and the wheel radius calibration values (WRAcal,x) by computing a difference between the wheel radius analysis output signals (WRAx) and corresponding wheel radius calibration values (WRAcal,x), wherein the method further comprises:

detecting, by the one or more processors, a second tire pressure deviation of the vehicle's tire before determination of any of the wheel radius calibration values (WRAcal,x) by computing a gradient of the wheel radius analysis output signals (WRAx) with respect to time indicative of a temporal developing of the number of the temporally successive wheel radius analysis output signals (WRAx), wherein the gradient is computed based on a comparison of relative wheel radii estimates at one point in time with relative wheel radii estimates at one or more previous points in time, comparing the gradient to a threshold modified according to an ambient temperature before determination of any of the wheel radius calibration values (WRAcal,x), and when the gradient exceeds the threshold indicating a pressure drop of the vehicle's tire during calibration, resetting a calibration process performed by the one or more processors to prevent the determining of the wheel radius calibration values (WRAcal,x) using distorted wheel radius analysis output signals (WRAx) caused by an ongoing pressure drop, wherein distorted wheel radius analysis output signals (WRAx) determined during the ongoing pressure drop degrade leakage detection; and wherein the method further comprises generating a warning signal that activates a warning system of the vehicle when the gradient exceeds the threshold.

\* \* \* \* \*